(12) United States Patent  (10) Patent No.: US 7,775,245 B2
Gershtein et al.  (45) Date of Patent: Aug. 17, 2010

(54) SECURE LOOP SYSTEM AND METHOD FOR SUPPLY AND DELIVERY OF PRODUCT CONTAINED IN A CARRIER

(75) Inventors: Vladimir Yliy Gershtein, Allentown, PA (US); Karen M. Campbell, Coopersburg, PA (US); Paul Anthony Mattiola, Coopersburg, PA (US); Derek Miller, Emmaus, PA (US); Thomas Joseph, Emmaus, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 1141 days.

(21) Appl. No.: 11/398,965

(22) Filed: Apr. 6, 2006

(65) Prior Publication Data

US 2007/0034532 A1    Feb. 15, 2007

Related U.S. Application Data

(60) Provisional application No. 60/707,036, filed on Aug. 10, 2005, provisional application No. 60/669,522, filed on Apr. 8, 2005.

(51) Int. Cl.
*B65B 1/04* (2006.01)
(52) U.S. Cl. .............................. 141/18; 141/2; 141/231
(58) Field of Classification Search ..................... 141/2, 141/4–7, 18, 94, 100, 231, 232
See application file for complete search history.

(56) References Cited

U.S. PATENT DOCUMENTS 4,211,537 A    7/1980 Teitel (Continued)

FOREIGN PATENT DOCUMENTS

EP    0 003 588    8/1979

(Continued)

OTHER PUBLICATIONS

U.S. Appl. No. 10/430,246, filed May 6, 2003, Pez, Guido Peter, et al.

(Continued)

*Primary Examiner*—Gregory L Huson
*Assistant Examiner*—Jason K Niesz
(74) *Attorney, Agent, or Firm*—Michael K. Boyer

(57) ABSTRACT

Systems and methods for distributing a product releasably incorporated within a carrier, and for removing the product and returning the carrier for rehabilitation. In one embodiment, the system includes a first supply loop comprising a manufacturing facility for releasably incorporating a product into a first carrier to form fresh. The first loop further includes transportation means for conveying fresh to a first user, the first user including a fresh storage vessel for receiving and storage of fresh. The first user further comprises means for removing product from the carrier to form spent, and a spent storage vessel for receiving, storing, and dispensing of spent. The loop further includes means for returning the spent to a rehabilitation facility of the spent to form fresh wherein a product is contained in a carrier. The carrier may be in any physical state such as for example, solid, liquid, vapor, plasma, or any combination thereof. In addition, the carrier may involve any known mechanism to capture, retain, or release product, for example, chemical reaction, adsorption, dilution, among others. Optionally, the invention comprises a second supply loop that received product liberated from the first supply loop, without exchanging carrier, fresh, or spent with the first supply loop. The invention thus provides for product transfer efficiently and economically with minimal possible losses of the carrier quantity and quality. Contamination of a carrier and/or unintended mixing of different carriers is avoided, or at least localized to limited quantities.

17 Claims, 4 Drawing Sheets

Schematic of a single carrier loop process

U.S. PATENT DOCUMENTS

| | | | |
|---|---|---|---|
| 4,531,656 A | 7/1985 | Nitchman et al. |
| 5,148,945 A | 9/1992 | Geatz |
| 5,292,030 A | 3/1994 | Kateman et al. |
| 5,417,346 A | 5/1995 | Ferri, Jr. et al. |
| 5,579,233 A | 11/1996 | Burns |
| 5,758,571 A | 6/1998 | Kateman et al. |
| 5,803,599 A | 9/1998 | Ferri, Jr. et al. |
| 5,923,572 A | 7/1999 | Pollock |
| 5,952,117 A | 9/1999 | Colborn et al. |
| 5,992,686 A | 11/1999 | Cline et al. |
| RE36,510 E | 1/2000 | Burns |
| 6,374,870 B1 | 4/2002 | Muller |
| 6,382,264 B1 | 5/2002 | Tsai et al. |
| 6,402,938 B1 | 6/2002 | Moore et al. |
| 6,536,523 B1 | 3/2003 | Kresnyak et al. |
| 6,558,825 B1 | 5/2003 | Faris et al. |
| 6,616,036 B2 | 9/2003 | Streicher et al. |
| 6,655,155 B2 | 12/2003 | Bishop |
| 6,745,801 B1 | 6/2004 | Cohen et al. |
| 6,802,875 B1 | 10/2004 | Kimbara et al. |
| 6,834,508 B2 | 12/2004 | Bradley et al. |
| 7,169,489 B2 | 1/2007 | Redmond |
| 7,226,676 B2 | 6/2007 | Faris et al. |
| 2003/0108601 A1 | 6/2003 | Chrai et al. |
| 2003/0206102 A1 | 11/2003 | Joao |
| 2004/0223907 A1 | 11/2004 | Pez et al. |
| 2005/0002857 A1 | 1/2005 | Pez et al. |
| 2005/0090704 A1 | 4/2005 | Roettger et al. |
| 2006/0060817 A1 | 3/2006 | Tempel et al. |
| 2006/0118201 A1* | 6/2006 | Li et al. ..................... 141/231 |
| 2006/0226050 A1 | 10/2006 | Gershtein et al. |
| 2006/0239905 A1 | 10/2006 | Gershtein et al. |

FOREIGN PATENT DOCUMENTS

| | | |
|---|---|---|
| EP | 0 862 423 | 9/1998 |
| EP | 1 081 780 | 2/2001 |
| EP | 1 081 780 A | 3/2001 |
| JP | 06-100096 A1 | 4/1994 |
| JP | 2001-068138 A1 | 3/2001 |
| JP | 2004-501495 A1 | 1/2004 |
| JP | 2005009062 | 1/2005 |
| JP | 2005-527501 A1 | 9/2005 |
| WO | WO 97/02898 | 1/1997 |
| WO | WO 98/01118 | 1/1998 |
| WO | 01/99222 A | 12/2001 |
| WO | WO 03/061047 | 7/2003 |
| WO | 2004/076945 A1 | 9/2004 |

OTHER PUBLICATIONS

U.S. Appl. No. 10/833,467, filed Apr. 27, 2004, Bagzis, Larry et al.
U.S. Appl. No. 10/833,484, filed Apr. 27, 2004, Pez, Guido Peter et al.
U.S. Appl. No. 10/948,277, filed Sep. 23, 2004, Tempel, Daniel et al.
U.S. Appl. No. 11/208,723, filed Aug. 23, 2005, Tempel, Daniel et al.
U.S. Appl. No. 11/398,961, filed Apr. 6, 2006, Vladimir Yliy Gershtein et al.
U.S. Appl. No. 11/398,960, filed Apr. 6, 2006, Vladimir Yliy Gerwshtein et al.

\* cited by examiner

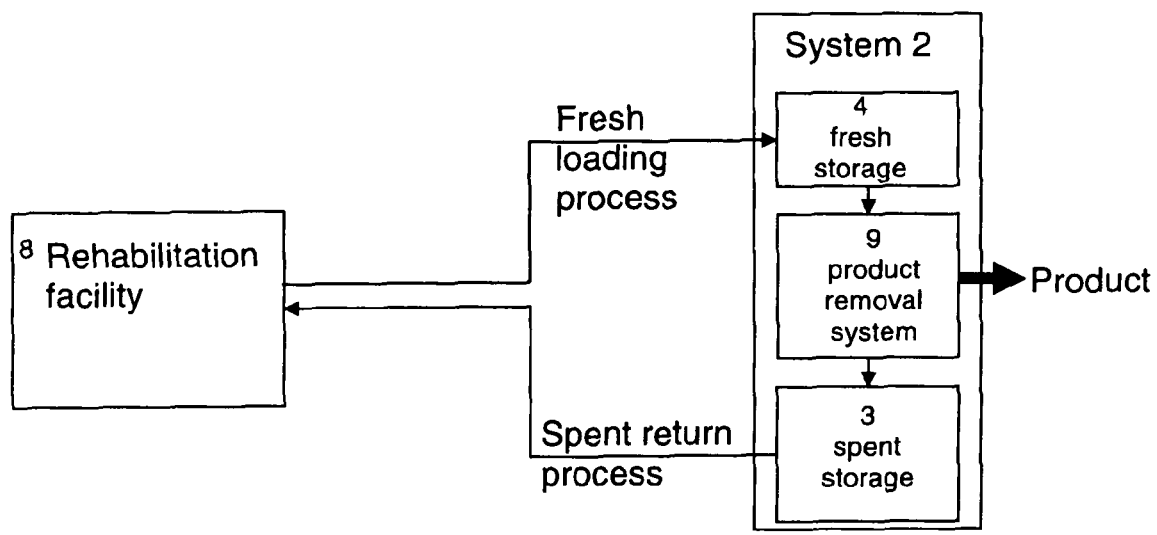
Figure 1. Schematic of a single carrier loop process

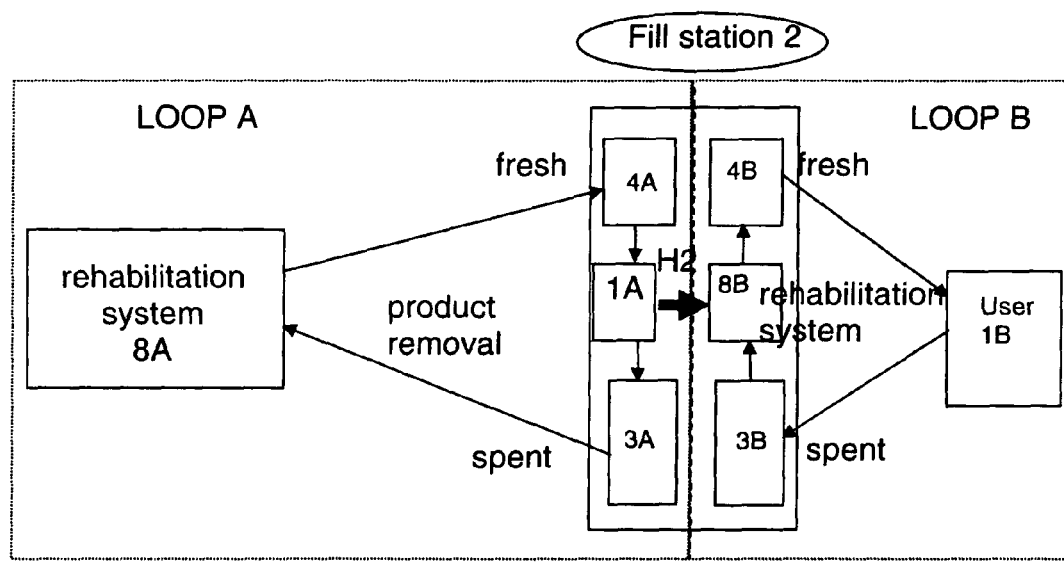
Figure 2. Schematic of a product delivery multi-loop system

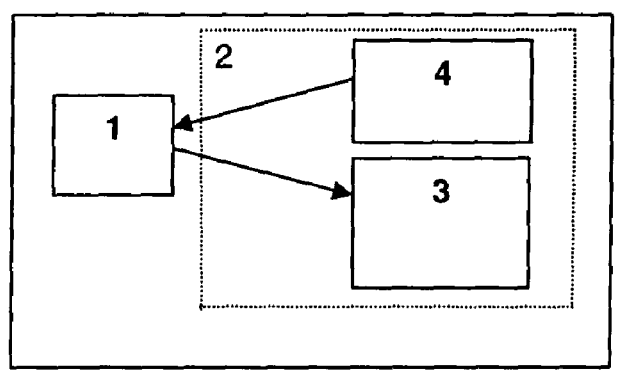
Figure 3 – Schematic of simple loading and unloading operation example

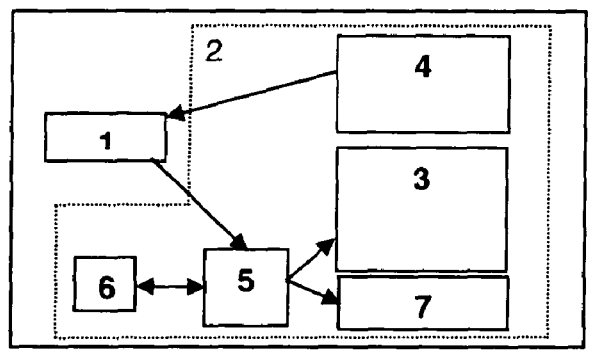
Figure 4  Schematic of a loading and unloading system at a refilling station

SECURE LOOP SYSTEM AND METHOD FOR SUPPLY AND DELIVERY OF PRODUCT CONTAINED IN A CARRIER

CROSS-REFERENCE TO RELATED APPLICATIONS

This application claims the benefit of Provisional Application No. 60/669,522, filed on Apr. 8, 2005 and Application No. 60/707,036, filed on Aug. 10, 2005. The disclosure of the Provisional Application is hereby incorporated by reference.

The subject matter of the instant invention is related to the following commonly assigned Patents and patent application Ser. No. 10/430,246, filed May 6, 2003 and entitled "Hydrogen Storage by Reversible Hydrogenation of Pi-Conjugated Substrates" (now Publication No. US2004-0223907-A1); Ser. No. 10/833,467, filed Apr. 27, 2004 and entitled "Method of Delivering a Reversible Hydrogen Storage Fuel to a Mobile or Stationary Fuel Source"; and Ser. No. 10/833,484, filed Apr. 27, 2004 and entitled "Hydrogen Storage By Reversible Hydrogenation Of Pi-Conjugated Substrates"; U.S. patent application Ser. No., 11/398,961, filed of even date herewith and entitled "System and Method for Supply and Delivery of Product Contained in a Carrier"; and U.S. patent application Ser. No., 11/398,960, filed of even date herewith and entitled "Efficient System and Method For Delivery of Product and Return of Carrier." The disclosure of these patents and patent applications is hereby incorporated by reference. These patents and patent applications disclose carrier, spent, fresh and products that can be used in accordance with the instant invention.

BACKGROUND OF THE INVENTION

The instant invention relates to a systems and methods for delivering, distributing, selling and exchanging carrier, product, fresh and spent. The carrier releasably incorporates at least one product. In one aspect of the invention, methods are provided for incorporating a product (e.g., an otherwise gaseous or unstable chemical product), such as hydrogen, within a carrier (i.e., fresh as defined herein), distributing fresh to a user, and recovering spent (i.e., comprising at least one dehydrogenated carrier) for rehabilitation, which may include regeneration.

By way of background, hydrogen-based fuel cells are viewed as a replacement for conventional means of generating electricity, and hydrogen is viewed as potential fuel substitution for conventional internal combustion engines (ICE). While such hydrogen-based systems are desirable, hydrogen supply, delivery, and storage may provide a number of technical challenges. A typical hydrogen delivery truck carries hydrogen at low cryogenic temperature and elevated pressure. One alternative method employs compressed gas. Compressed gas supply may be limited, for example, by storage capacity. Another alternative comprises sorbents, for example, metal hydride sorbents, which may not be sufficient for this usage due to weight constraints. There is a need in this art for method of providing product for fuel cells or ICE usage in a safe, efficient and cost-effective manner. There is also a need in this art for methods that provides a simple, efficient, and low-cost transaction that can be implemented by all product customer groups, including but not limited to vehicle operators, filling stations, and other users.

Conventional methods and systems are disclosed in Cohen, Joseph Perry and Copeman, Tama Maya, "Mobile hydrogen generation and supply system", U.S. Pat. No. 6,745,801 B1, 8 Jun., 2004; Bradley, Keith, Kwon, Young-Kyun, Gruner, George, Wyatt, Jeff, Jhi, Seung-Hoon, Gabriel, Jean Christophe, "Hydrogen storage and supply system", U.S. Pat. No. 6,834,508B2, 28 Dec., 2004; Metsiger, Pierre, "Pharmaceutical Composition for Oral Delivery" Patent Application WO98/01118 and EP0862423A1, 15 Jan., 1998; Vickers, Michael T., Jianhua, Yan and Monson, Robert J., "Comprehensive Product Delivery System" Pat. Application WO9702898, 30 Jan., 1997; Chrai, Suggy S., Murari Ramaswamy, "Liquid Pharmaceutical for Oral Delivery" US Patent Application Publication No. US20030108601A1, 12 Jun. 2003; Moore, Howard F. and Shaffer, Jr., Arthur G in U.S. Pat. No. 6,402,938B1, "Vaporization of used motor oil with non-hydrogenating recycle vapor"; Kresnyak, Steve and Braun, Alex in U.S. Pat. No. 6,536,523B1, "Water treatment process for thermal heavy oil recovery" published on 2003-03-25; and, YAMADA MASAO in JP2005009062A "WASTE PAPER FIBROUS MATERIAL UTILIZING SYSTEM AND WASTE PAPER DEFIBRATING MACHINE" published on 2005-01-13. The disclosure of the previously identified patents and publications is hereby incorporated by reference.

However, none of the above references adequately solve the problems addressed by the present invention.

BRIEF SUMMARY OF THE INVENTION

The instant invention solves or avoids problems that arise when conventional methods are used for supplying chemical product. The invention provides a carrier that includes at least one chemical as a product, as well as systems and methods for delivering, distributing, transferring, separating, collecting and detecting. The inventive method and systems also comprise distributing carrier between the various carrier operational and distribution locations as well as to the user locations. The carrier can comprise a composition manufactured so as to include product, or a previously manufactured composition that is processed to incorporate product. Product can be released from the carrier by using any suitable means or method thereby generating spent. The systems and methods further provide for collecting spent. The collected spent can be rehabilitated to provide a carrier that can be regenerated to provide fresh.

In one embodiment, the invention is a system for distributing a product releasably incorporated within a carrier, and for removing the product and returning the carrier for rehabilitation. The system includes a first supply loop comprising a manufacturing facility to form fresh. A "manufacturing facility" comprises process equipment and can be stationary, or comprise a mobile or transferable unit, or a component of another facility or unit. The first loop further includes transportation means for conveying fresh to a first user, the first user including a fresh storage vessel for receiving and storage of fresh. The first loop further comprises means for removing product from the carrier to form spent, and a spent storage vessel for receiving, storing, and dispensing of spent. The loop further includes means for returning the spent to a rehabilitation facility of the spent to form fresh.

In a second embodiment, the invention is a system for distributing a product releasably incorporated within a carrier, and for removing the product and returning the carrier for rehabilitation. The system includes a first supply loop comprising a manufacturing facility that forms fresh, and transportation means for conveying fresh to a first user. The first user includes a fresh storage vessel for receiving and storage of fresh, and means for removing product or product elements from the carrier to form spent. The first user further includes means for conveying the product to a second supply loop. The system in this embodiment includes a spent storage vessel for receiving, storing, and dispensing spent from the first user and includes means for returning the spent to a rehabilitation facility.

In a third embodiment, the invention is a method for distributing a product releasably incorporated into a carrier. The method comprises the steps of releasably incorporating a product into a carrier to form fresh, distributing fresh to a first user for removal of product to form spent, without contaminating the product or spent; and conveying uncontaminated spent to a rehabilitation facility having means for rehabilitating the spent to form fresh.

The instant systems and methods can be employed for delivering a carrier material with included product (fresh) such as hydrogen, wherein the hydrogen can be released in a manner suitable for consumption, such as in a fuel cell or an ICE (e.g., by a dehydrogenation reaction). Fresh has the ability to be processed so that it can release hydrogen thereby becoming spent. Spent then may be regenerated back into fresh by rehabilitation to contain hydrogen or its elements (e.g., hydrogen is removed from fresh and hydrogen is added to rehabilitate spent for reuse as fresh). A list of specific carriers capable of reversibly carrying, for example, hydrogen may be found in US patent applications US2004/0223907 and US2005/0002857 (hereby incorporated by reference) and may include but not limited to the following: perhydroindolo[3,2,1-jk]carbazole, perhydrodibenzofuran, dodecahydrobiphenylene, perhydro-N,N'-diethyl-bis-indolymethane, perhydro-N-ethylcarbazole, perhydro-N-methylcarbazole, and 10-methyl-10H-phenoxazine. The instant invention delivers and/or dispenses fresh while collecting spent. The presence of a carrier in both streams of delivered fresh and returned spent is addressed by the instant invention.

The inventive method and systems comprises exchanging at least a portion of fresh for at least a portion of spent on a substantially equal basis. By "substantially equal basis", it is meant that a defined amount of spent corresponds generally to a defined amount of fresh that is dispensed (e.g., into a reservoir of a vehicle). Such amounts may not be identical due to various reasons such as, for example, product withdrawal from fresh and possibly variations in delivery equipment in use, measurement devices, computer control systems or other losses associated with removing product from fresh, among other causes for variation. The inventive method and systems also comprise distributing carrier between the various carrier operational and distribution locations as well as to the user locations (e.g., from the carrier manufacturer and/or rehabilitation to a distribution station or to a filling station interface).

The following defined terms are used herein:

The following defined terms are used herein:

"Product" comprises any chemical that is capable of being releasably stored in a carrier. By way of non-limiting example, product may comprise hydrogen, fluorine, chlorine, oxygen, arsine, stibine, phosgene, methane, hydrogen fluoride, gases containing boron, phosphorus, aluminum, or silicon components, and combinations thereof. By way of further example, product may be incorporated into a carrier fully intact (such as $H_2$), and/or as elements of a product (such as H bound to another non-H molecule), so long as the elements can be reassembled to form product after release from a carrier.

"Carrier" comprises a substance or mixture of substances that is able to incorporate a product or product elements, and to release the product, thereby becoming fresh and spent reversibly. There may be different carriers for the same product, one carrier for multiple products, or different carriers for different products. By way of non-limiting examples, carrier may comprise one or more of organic compounds (e.g., ionic liquids, solvated compounds, among others)

"Fresh"—the carrier when it incorporates product or product elements.

"Spent"—the carrier when depleted or partially depleted of product or product elements. Spent may exhibit some similar chemical and/or physical properties as fresh and/or the carrier. However, spent will have at least one detectable chemical and/or physical difference when compared to fresh, such as, but not limited to, different phases, specific gravity, viscosity, density, vapor pressure, ignition point, miscibility, and other known chemical and/or physical properties.

"User" is any entity, person, or device capable of receiving at least one of fresh, spent, carrier, product, and product elements. By way of non-limiting example, a user may be a fuel cell, a combustion engine, filling station, industrial process, distribution system, or any other device or system.

"Regeneration" comprises any process that incorporates a carrier with a product or product elements. By way of non-limiting example, where a product is hydrogen, regeneration could be hydrogenation of an unsaturated organic carrier.

"Rehabilitation" comprises restoring spent into fresh. Rehabilitation may include product manufacture, carrier manufacture, regeneration, recycling, purification, analysis and testing, and other similar processes.

Other features and advantages of the present invention will be apparent from the following more detailed description of certain embodiments, taken in conjunction with the accompanying drawings which illustrate, by way of example, the principles of the invention.

BRIEF DESCRIPTION OF SEVERAL VIEWS OF THE DRAWINGS

FIG. 1 is a schematic of a single carrier loop process.

FIG. 2 is a schematic of a product delivery multi-loop system.

FIG. 3 is a schematic of a loading and unloading system.

FIG. 4 is a schematic of a loading and unloading system at a refilling station.

Numbering of the various elements in the figures is intended to maintain consistency of the description of the numbered elements, and to illustrate the interaction and potential interchangeability of some elements.

DETAILED DESCRIPTION OF THE INVENTION

The techniques described below are related to a method or system wherein a product (e.g., hydrogen), is contained in a carrier. In general, the carrier may be in any physical state such as a solid, liquid, vapor, plasma, or any combination of the above. The carrier can include at least one additive for modifying at least one chemical or physical property of the carrier (e.g., an additive to lower the freezing point of the carrier). In addition, the carrier may involve any suitable mechanism to capture, retain, or release product, for example, chemical reaction, absorption, adsorption, dissolution, dilution, those disclosed in the aforementioned commonly assigned Patents and Patent Applications, among other mechanisms. In general, the carrier is used to contain a product or product elements. The carrier with contained product or its elements (i.e. fresh), is used to store and/or transport the product. Fresh may be transported by using methods or equipment known in the art (e.g. ISO containers, cylinders, rail car containers, etc). Once product is removed, the product depleted carrier (i.e., spent), may be returned back for rehabilitation using the same or different equipment that is used for delivery of fresh. When rehabilitated, the carrier becomes fresh and is containing the product or its elements again. The entire operation and delivery system of product and carrier distribution should be conducted in a manner that is efficient and/or reduces the potential for contamination of carrier. For example, a purged connect/disconnect equipment may be used to prevent air from coming into the fresh or spent holding capacity in the case when air may be a contaminant to fresh, spent, or carrier. Devices such as, for example, isolation valves, caps, plugs, etc., may be used while the connecting ends are in transit or not in service to prevent contamination such as spider webs, bug remains, water, road dirt, etc. The primary product described herein is hydrogen; however, the various aspects described herein may be useful for other products that can be releasably incorporated into a carrier. While one desirable aspect of the invention relates to the ability to rehabilitate spent, if desired, the carrier (alone or with product) may have value in other applications, for example, the carrier can be used as fuel in an internal combustion engine (ICE).

A product enriched carrier (i.e., fresh), may be loaded onto a user (device), for example a vehicle, power generator, distribution facility, chemical processing system, among others (e.g. which are capable of storing carrier, separating carrier from product and/or consuming the product). As product is being removed from fresh, spent is generated and may be stored in a storage capacity (e.g., a vessel associated with the vehicle and belonging to the user). The storage capacity may be the same or different from that for fresh. For example, in one embodiment, two separate storage vessels may be used, where one is used only for fresh and the other one is used only for spent. In the other embodiment, one vessel with a stationary separating wall may be used defining two separate compartments of said vessel. Each compartment may be dedicated to either fresh or spent. Yet in the other embodiment, one vessel with a divider may be used, wherein a divider may comprise at least one of: i) fixed dividers within the user storage vessel; ii) movable dividers within the user storage vessel; iii) a bladder within the user storage vessel; iv) chemical separation of fresh and spent based upon inherent or modified properties of each; and v) physical separation of fresh and spent based upon inherent or modified physical properties of each Spent may have to be removed and replaced by fresh once all or substantially all product capacity is consumed. Replacement of spent by fresh may take place during a refilling operation. The product separating device may continue functioning during and/or after the refilling operation is completed. There are different ways to exchange spent for fresh or regenerate spent. For example, rehabilitation of spent on board of a device (e.g., on board a vehicle), rehabilitation at a refilling site (e.g., onsite rehabilitation), rehabilitation at a remote site (e.g. manufacturing), spent is exchanged for fresh on a defined exchange basis, etc. In addition, the rehabilitation unit may be stationary, mobile, or a combination of both. Also, the user may be stationary, for example, power generator, individual house or building, industrial applications; mobile, for example, vehicles with fuel cell, distribution trailer, etc.; or portable, for example, power tools, cell phones, computers with fuel cells, among other applications.

In one exemplary aspect of the invention, the delivery means is associated with the carrier (fresh and spent) in such a way that product delivery, carrier transfer, and carrier transportation delivery is achieved. Delivery means can comprise at least one of a pipeline, mobile transportation system such as a truck or barge, among other suitable means. The carrier is contained within the delivery means so that when a quantity of fresh carrier is transferred at a location, a substantially equal amount of spent carrier is transferred. Transferring means for a carrier can comprise any suitable device capable of transferring a carrier from one entity to another entity. While any suitable transferring means can be used, examples of components of transferring device include pipeline, hose, nozzle, or dispenser.

There are different ways to exchange spent for fresh or regenerate spent. For example, rehabilitation of spent on board of a device (e.g., on board a vehicle), rehabilitation at a refilling site (e.g., onsite rehabilitation), spent is exchanged for fresh on a defined exchange basis, etc. In addition, the onsite rehabilitation unit (or manufacturing facility as defined above), may be stationary, mobile, or a combination of both. Also, the user may be stationary, for example, power generator, individual house or building, industrial applications; mobile, for example, vehicles with fuel cell, distribution trailer, etc.; or portable, for example, power tools, cell phones, computers with fuel cells, among other applications.

In general, product, fresh, and spent may be different molecules. That is, hydrogen incorporated into the carrier may form a completely different material or substance from what both were separately. One example of a product and carrier combination may be hydrogen, quinoline, perhydroquinoline, and 1,2,3,4-tetrahydroquinoline. Quinoline (e.g. spent) combined with hydrogen through hydrogenation may form perhydroquinoline (e.g. fresh). Through dehydrogenation to release product, partially dehydrogenated perhydroquinoline may become 1,2,3,4-tetrahydroquinoline (e.g. spent) or fully dehydrogenated quinoline (e.g. spent). Another example of a product and carrier combination may comprise hydrogen, sodium borate, and sodium borohydride. Sodium borate may be processed in a manner that may become sodium borohydride, for example with a process that may or may not include the direct combination of hydrogen gas. Hydrogen may be released from sodium borohydride in a reaction with water and a catalyst. A further example of a product and carrier combination may comprise phosphine and at least one ionic liquid, for example using 1,3-dimethylimidazolium as the cation and $Al_2Cl_7^-$ as the anion. Phosphine may be removed from the ionic liquid (fresh carrier) by applying a pressure differential to the fresh carrier, i.e. a vacuum. Additional examples of suitable ionic liquids are disclosed in U.S. patent application Ser. Nos. 10/948,277 and 11/208,723 entitled "Ionic Liquid Based Mixtures For Gas Storage And Delivery" (hereby incorporated by reference). The product can be rehabilitated or released from the carrier by: 1) exposure to at least one catalyst, 2) applying or removing energy, for example heat, 3) applying or removing pressure, 4) combining with at least one reactant, 5) combinations of the foregoing, among other process parameters. The product can be released from the carrier by exposure to a plurality of systems and methods. One example comprises exposing the carrier to a first method to release a portion of the product and thereafter exposing the carrier to a second method for releasing another portion of the product. The first and second methods can be the same method (e.g., conducted under different conditions) or distinct processes.

The presence of a carrier in both streams (i.e., delivered fresh and returned spent), presents new challenges, which have not been addressed in presently available supply and delivery logistics. For example, a vehicle stopped at a refilling station may have to exchange spent for fresh versus just receiving fuel such as, for example, gasoline. Examples of useful carriers and additional information regarding certain aspects of the embodiments described herein may be found in U.S. patent application Ser. No. 10/430,246 filed May 6, 2003; U.S. patent application Ser. No. 10/833,467 filed Apr. 27, 2004; and U.S. patent application Ser. No. 10/833,484 filed Apr. 27, 2005, all of which are incorporated in their entireties herein by reference.

Supply and delivery logistics may include loading and unloading of delivered materials to the user, for example, via a distribution system. Transportation and exchange security, unreasonable losses, and protection of the carrier quality become important issues requiring implementation of some protective measures since carrier by itself may be a valuable asset (e.g., the carrier can be used a plurality of times to deliver product or used in non-carrier applications such as a precursor to produce another compound). Certain protective measures may be implemented monitoring carrier in transit and during the exchange operations to avoid unreasonable losses, contamination, degradation caused by use hereunder, process induced changes, or theft. Examples of contamination may include presence of foreign material that may or may not be easily separated from the carrier but may render the carrier not suitable for reuse. Examples of contaminants can include, for example, water, oils, oxygen, among others. Carrier contamination may occur as a result of, for example, an accident, introduction of rain water into an open system; a result of normal or abnormal operations, for example carrier degradation, reactant or product carryover; or a result of unlawful actions, for example, intentional introduction of contaminants such as oils, slurries, etc. into a vehicle fuel tank.

In order to preserve carrier, one entity may want to retain the ownership of the carrier while controlling not only, for example, spent rehabilitation processes but supervising fresh delivery and spent return processes as well. Hereafter the process where the carrier makes full circle, i.e. from a manufacture and/or rehabilitation center to, for example, distribution facilities and back to the manufacture/rehabilitation center, will be called product carrier loop. In general, product carrier loops and methods allow for implementation of multiple carriers in product delivery and distribution processes. Details of the product carrier loop process are described herein.

A schematic of a single product carrier loop and process is depicted in FIG. 1. Note that hereafter numbering of all elements in all figures are kept the same for consistency of the description and to illustrate the interchangeability of these elements. Referring now to FIG. 1, rehabilitation facility 8 may be a manufacturing facility for carrier and/or product, but in any case incorporates product into spent and/or carrier to form fresh. Facility 8 may be stationary, or a mobile or transferable unit. In addition to rehabilitation, facility 8 may manufacture carrier, the product or both. Facility 8 produces fresh and delivers it to system 2. System 2 may be any system able to utilize fresh from facility 8 and return spent back to a facility 8. System 2 may be, for example, product refilling station, product distribution system, product user, or any other user. Both fresh loading and spent return operations may be completed, for example, simultaneously, parallel, sequentially, or in any desired combination. Fresh is loaded into fresh storage capacity 4, typically residing within system 2. Product removal system 9, for example a de-hydrogenation system in the case of hydrogen being a product, removes product from the carrier and makes product available. In this case, product may be made available, for example, to a vehicle fuel cell, power generator, another product distribution or product delivery system, among others.

When product is removed from fresh, such as by a product removal system 9, spent is generated. Spent is collected in spent storage capacity 3 of system 2 and then returned to facility 8 where it may be rehabilitated into fresh. Therefore, a carrier used by facility 8 to carry product to system 2 is transported to facility 8, thereby forming a closed supply loop. The cycle within the loop may be repeated once the returned spent is rehabilitated into fresh.

Facility 8 may be interested in preventing the carrier from being contaminated, lost, among other undesirable occurrences, in the loop and, therefore, may choose to stay in control and manage all operations residing within the loop. For example, facility 8 may own the carrier and may choose to maintain the carrier ownership everywhere within the loop, e.g. system 2. Facility 8 may additionally or alternatively choose, for example, to own or hire designated fresh/spent fleet of portable containers to deliver fresh and return spent. Facility 8 may consider it desirable to control product removal system 9 as well. Therefore, facility 8 may establish and exercise complete control and supervision of both product removal and the carrier circulation system within the loop, thereby providing favorable conditions for minimizing carrier contamination, losses, and other undesirable occurrences. In one embodiment, spent quality screening methods can be implemented based on certain known physical and/or chemical properties of carrier, fresh, spent, and product. For example, pre-established density or viscosity curves may be used to identify, quality and/or quantity of fresh, spent, carrier, product or combinations thereof.

For example, in order to monitor identity and quality of fresh and spent in the loop and the process of exchange of spent and fresh, each loop may include at least one device or means, which measures product content in the carrier. For example, product content may be determined by measuring fresh or spent density and comparing the results to data available from a pre-established density curve related to a specific carrier. In general, each carrier may have its own pre-established quality control curves. Density measurements conducted with a carrier comprising hydrogenated Quinoline show that density may vary by as much as 10% increasing when the contained hydrogen level is decreasing. For example, density of spent comprising Quinoline was measured at 1.093 g/cc. When Quinoline is fully hydrogenated, it (as a carrier) becomes fresh comprising Perhydroquinoline with measured density of 0.933 g/cc and carrier that is only partially spent becomes, for example, 1,2,3,4-Tetrahydroquinoline with measured density of 1.061 g/cc. A specifically defined deviation level from pre-established curves may be used as an indication of spent contamination. In general, adjacent loop(s) may share analytical equipment to maintain cost effective operation or have separate analytical equipment if, for example, processing different carrier(s), which may be considered contaminant(s) for the carrier in the adjacent loop(s).

Pre-established viscosity curves may also be used in the same manner as density curves. For example, analysis based on viscosity measurements were shown feasible to implement as fresh/spent quality control measures. It was demonstrated that a carrier viscosity, light absorption properties, etc., may change during hydrogenation/dehydrogenation cycle. For example, in laboratory experiments of the carriers N-ethylcarbazole, tetrahydro-N-ethylcarbazole, and perhydro-N-ethylcarbazole, the viscosity of perhydro-N-ethylcarbazole increases 7.4 times as it is dehydrogenated. All numbers measured using a Brookfield dynamic viscometer with

2 spindle at 100 rpm were as follows: Perhydro-N-ethylcarbazole N-ethylcarbazole 13.5 centipoise and Tetrahydro-N-ethylcarbazole 100 centipoise. Such a difference in viscosity allows generation of a fresh/spent control curve for fresh/spent quality analysis.

Similarly, spent fresh quality and product content control may be implemented with help of viscometers, conductivity and density measuring devices, chemical analyzers, gas analyzers, chromatographs, ultraviolet/visible sensors (UV/Vis), light and infrared light (IR) sensors, microwave sensors, nuclear magnetic resonance (NMR) spectroscopy, magnetic susceptibility, laser technology, and alike sensors. Product release, for example hydrogen, may be monitored for identifying equipment performance helping in maintenance scheduling and process control. Hydrogen release during dehydrogenation may be determined by measuring flow or volume of hydrogen (flow meter, wet test meter, water displacement). Hydrogen release may also be quantified by performing analysis of the liquid carrier to identify ratios of chemical compounds. This can be done by implementation of known measuring technologies involving GC, NMR, IR, UV/Vis, among others. In another example, perhydro-N-ethylcarbazole (e.g. fresh), IR can be used to identify the formation of N-ethylcarbazole (e.g. spent). There are multiple bands related to aromatic C—H bending at 1230, 747, and 721 $cm^{-1}$. Yet in another example, for perhydro-N-ethylcarbazole, UV/Vis can be used to identify the formation of N-ethylcarbazole. The $\pi$->$\pi$* transition at 270 nm is absent in perhydro-N-ethylcarbazole and grows as aromatic intermediates form and is strongest when fully dehydrogenated to N-ethylcarbazole. A calibration could be set up to quantify the amount of dehydrogenation based upon the intensity of this band.

The fresh/spent exchange procedures may vary according to system and user needs. In one embodiment, exchange of fresh and spent may occur based on the same carrier load rotation during a one-stop visit of the fresh/spent delivery means, for example, a delivery truck. The same carrier load rotation is an operation when the same product carrier load is used for product delivery with fresh and returned back after product removal process as spent. In this case, the carrier means may unload fresh wait until product is removed and receive spent back for return to a rehabilitation facility. For example, a truck delivers a container full of fresh, waits until fresh is dehydrogenated, receives spent, and returns the latter for rehydrogenation to a rehabilitation center. That presumes that the truck may be waiting until the product is removed, which may not be a desired delivery solution. In another embodiment, delivery means may deliver fresh and receive spent, which was generated from previously delivered load of fresh. For example, delivery truck may simply swap the container with fresh for a container with spent or unload fresh and load spent, which was already collected at the user site. Such a method may help to eliminate unproductive wait time when product removal process takes substantial time.

The loop operation described above and depicted in FIG. 1 may present an opportunity to utilize different types of product carriers. Additionally and alternatively, a multi loop system may be implemented to deliver a product to an end user. In general, each loop may operate with its own product carrier, with no exchange of carrier, spent, or fresh occurring between the loops. Normally, product is transferred from one loop to the other and optionally, other processes or utilities may be exchanged or shared between loops such as heat exchange or electrical power. A schematic of such a multiple loop system is depicted in FIG. 2.

Referring now to FIG. 2, rehabilitation system 8A produces fresh and delivers it to users, for example, fill station 2. Fill station 2 may be an individual refilling station selling product to consumers, a distribution net such as regional or local supply locations, and the like. At station 2, fresh may be unloaded into fresh storage 4A. Station 2 may be equipped with product removal system 1A, for example, dehydrogenation unit. In general, system 1A may completely or partially reside within fresh transferring means or station 2. System 1A extracts product from fresh in product carrier loop A and transfers it to product carrier loop B, for example, into spent rehabilitation system 8B. System 8B may contain different spent rehabilitation means such as but not limited to cleaning, purification, hydrogenation, etc. Transfer of a product, for example hydrogen, may be completed via a piping system or any other known product transfer means. System 8B may be similar to or different from system 8A. If similar, system 8B may be of a different scale and/or capacity. In addition, system 8B may be designed to handle different product carrier than that in system 8A. Spent created in system 1A is collected in spent storage 3A and then returned to rehabilitation system 8A for restoration into fresh, thus, completing product carrier loop A. Fill station 2 is further equipped with additional spent storage 3B, which belongs to product carrier loop B. Spent from storage 3B is rehabilitated in system 8B and then produced fresh is transferred into storage 4B. Storage 4B is designed to hold fresh inside product carrier loop B. User 1B may unload its spent into spent storage 3B and may be refilled with fresh from storage 4B, thus, completing product carrier loop B. User 1B may be, for example, a vehicle that produces spent, or a mobile fill station, or a regional or local transfill station, among others.

In the example above, independent product carrier loops A and B are provided such that the carrier of loop A does not mix with carrier of loop B, e.g. they do not interact such as to contaminate each other. Product is transferred from one loop to the other and optionally, other processes or utilities may be exchanged or shared between loops such as heat exchange or electrical power. In general, carriers in each loop and even product transfer mechanisms within each loop may be different in nature. A multi-product carrier loop system, for example, three loop system may be constructed if a user, for example, user 1B has its own carrier rehabilitation unit. In general, there is no limitation to the number of independent loops in order to prevent carrier contamination or avoid associated liabilities. In addition, each loop may be handled by a designated loop owner or loop supervisor responsible for all activities within the loop. Therefore, the loop-structured product delivery systems of the invention help to minimize and even avoid carrier contamination, carrier loss, or possible fraud associated with some transactions. In addition, product supply associated with proposed loop system may create an opportunity, for example for fill stations, to handle customers with different carriers, therefore expanding business and services.

It is important to note that fill stations or other entities may utilize special equipment or processes when exposed to two or more carriers and to both product removal and spent rehabilitation processes. For example, product removal system 1 may require significant energy supply to liberate a product, for example, dehydrogenation process. In another example, the required energy for the dehydrogenation process per unit (e.g., mole) of carrier is provided in the manner described in U.S. Patent Application Publication No. US2005/0002857 (incorporated by reference). In another example, product can be liberated by using pressure. Spent rehabilitation system 8 may require significant energy removal for spent rehabilitation process, for example, hydrogenation process. Example of the required energy for hydrogenation per unit of carrier can be found in the same patent application US2005/0002857. Both systems may benefit each other if designed together. Indeed, for the system depicted in FIG. 2 integration of system 1A from loop A with system 8B from loop B may help to solve heat supply/removal problem in the case of product transfer process, for example, hydrogenation/dehydrogenation processes. Product carrier from loop A and that from loop B may be exchanging energy, for example, in non-intrusive heat exchange processes and still may retain the carriers with different physical and/or chemical properties. For example, heat exchange equipment such as tube and shell or plate heat exchangers may be utilized to assist with supply and removal energy.

In general, user 1 or refilling station 2 may be stationary or mobile. For example, loading and/or unloading operations could take place at a site of user 1 where user 1 may have a fixed location, or may take place at a refilling station fixed location with user 1 being mobile. In addition, analytical capability may belong to either the user and/or refilling station, or may be a separate third party entity.

One of the examples of the loop implementation may be a user consuming product and generating spent from a loaded fresh. The user may be solely responsible for preservation of fresh/spent purity and grade that may be controlled by analytical devices during refill operations. One of the examples of the refill operation is depicted in FIG. 3 and may be implemented in a single loop or multiple loop systems.

Referring now to FIG. 3, user 1 is, for example, a vehicle that consumes a product, for example hydrogen that is contained in a load of fresh inside user's holding tank, such as a fuel tank or fuel cell. Once all or a part of a product is consumed, user 1 may refill product capacity at refilling site 2. Carrier deficient of product, namely spent, may be unloaded from user 1, for example from user 1 fuel tank, into spent collection tank 3 located at the refilling site 2. Fresh may be loaded from storage 4 into user 1. Once the operation is completed a user's tank is at least partially filled, and user 1 has fresh ready for removal of product, for example, by dehydrogenation.

In one system and method of the loading operation, substantially equal amounts of fresh and spent are loaded into user 1 from storage 4 and removed from user 1 to storage 3, respectively. The loading/unloading operation may take place through, for example, the use of dual nozzle dispenser described in U.S. patent application Ser. Nos. 10/430,246 and 10/833,467 (hereby incorporated by reference), or any other device capable of providing controlled loading and/or unloading operation. Substantially equal amounts of product, carrier, fresh and/or spent may be measured on substantially equal volume or mass basis, or may be measured on substantially equal product carrying capacity basis, among other suitable measurement methods. The latter describes the ability of the carrier to contain product after rehabilitation (e.g., re-hydrogenation). Also, because spent may be transformed into a molecule with different volume, mass, density and other properties than fresh, equal amount exchange specifically refers to the quantity of product that the carrier would be capable of containing if re-hydrogenated. For example, the spent volume may be about 80-85% of the fresh volume as it was measured during the lab experiments with the spent carriers Quinoline and N-ethylcarbazole. Hydrogen capacity of 5.7 wt. % was measured in N-ethylcarbazole when the latter was hydrogenated at 160° C. and 800 psia $H_2$ pressure and dehydrogenated at 180° C. and 15 psia $H_2$ pressure.

In order to minimize carrier contamination (e.g., at a central carrier storage, manufacturing or rehabilitation location), steps may be implemented for monitoring, identifying, or isolating the carrier. Local carrier contamination may lead to a massive carrier loss at central carrier processing and/or collection location or damage to the regeneration equipment. Examples of contamination may include presence of foreign material that may or may not be easily separated from the carrier but may make the carrier not suitable for reuse. Examples of contamination may include presence of foreign material that may or may not be easily separated from the carrier but may render the carrier not suitable for reuse. Examples of contaminants can include, for example, water, oils, oxygen, among others. Carrier contamination may occur as a result of, for example, an accident, introduction of rain water into an open system; a result of normal or abnormal operations, for example carrier degradation, reactant or product carryover; or a result of unlawful actions, for example, intentional introduction of contaminants such as oils, slurries, etc. into a vehicle fuel tank. The loading/unloading operation may be modified to minimize carrier contamination and to avoid contamination of large carrier quantities. An example of such a loading/unloading operation is depicted in FIG. 4 where another schematic of a refilling station is shown.

Supply and delivery logistics may include loading and unloading of delivered materials to the user, for example, via a distribution system. Transportation and exchange security, unreasonable losses, and protection of the carrier quality become important issues requiring implementation of some protective measures since carrier by itself may be a valuable asset (e.g., the carrier can be used a plurality of times to deliver product or used in non-carrier applications such as a precursor to produce another compound). Certain protective measures may be implemented monitoring carrier in transit and during the exchange operations to avoid unreasonable losses, contamination, degradation caused by use hereunder, process induced changes, or theft. Examples of contamination may include presence of foreign material that may or may not be easily separated from the carrier but may render the carrier not suitable for reuse. Examples of contaminants can include, for example, water, oils, oxygen, among others. Carrier contamination may occur as a result of, for example, an accident, introduction of rain water into an open system; a result of normal or abnormal operations, for example carrier degradation, reactant or product carryover; or a result of unlawful actions, for example, intentional introduction of contaminants such as oils, slurries, etc. into a vehicle fuel tank.

Referring now to FIG. 4, user 1 is involved in loading/unloading operations at refilling station 2. In some cases, there may be one or more users that proceed with loading/unloading operations, for example vehicles refilling at a fuel station. As previously shown in FIG. 3, refilling station 2 may have onsite storages of fresh 4 and spent 3, respectively. Refilling station 2 may also have additional intermediate collection tank 5, which is not shown in FIG. 1 of the refilling station but depicted in FIG. 4. This intermediate collection tank 5 may be smaller in size compared to holding tank 3. In addition, a number of intermediate tanks at a refilling station can correspond to the number of refilling dispensers. Intermediate tank 5 can be used to accept spent from a single user or multiple users. Tank 5 can be used for temporary isolation of a load of spent received from a single user and, therefore, providing controlled unloading operation.

Spent flowing from user 1 or contained in tank 5 can be analyzed by instrumentation means 6, such as but not limited to viscometers, conductivity and density measuring devices, chemical analyzers, gas analyzers, chromatographs, ultraviolet/visible sensors (UV/Vis), light and infrared light (IR) sensors, microwave sensors, nuclear magnetic resonance (NMR) spectroscopy, magnetic susceptibility, laser technology, and the like. Normally, this testing is done before the contents of tank 5 are transferred further. For example, analysis based on viscosity measurements were shown feasible to implement as fresh/spent quality control measures. It was demonstrated that a carrier may change its viscosity, light absorption properties, etc., during hydrogenation/dehydrogenation cycle. The examples of measured viscosity and light absorption properties of N-ethylcarbazole presented above demonstrated that the analytical methods based on measurements of this properties may be successfully implemented. Calibration and use of such instrumentation means can detect contaminants, but can also be accomplished to quantify the amount of dehydrogenation based upon the intensity of this band.

The results of the analysis may be used to determine spent quality, grade, nature, level of contamination, among other characteristics. The following may be implemented once the results are obtained:

collected spent may be transferred to storage 3 if analysis are favorable or are not conclusive but determined to be low risk, collected spent may be transferred into contamination storage 7 if analyses are not favorable or are not conclusive.

As it was mentioned above, tank 5 may accommodate the spent from one or multiple users. For example, if analytical methods used for spent quality check are capable to complete the check during refilling operation time, then tank 5 capacity may be equal to a maximum tank capacity of a user, for example 60 gallons tank. If on the other hand the employed analytical methods and equipment are not capable to complete the analysis of the unloaded spent during refilling operation, then tank 5 capacity may be equal to a product of the user tank volume and ratio of the required analysis time to the required refilling time. The latter logic may be shown as following:

$$\text{If } A_{time} \leq R_{time} \text{ then } V_{Tank5} = V_{user}$$

$$\text{If } A_{time} \geq R_{time} \text{ then } V_{Tank5} = V_{user} \times \frac{A_{time}}{R_{time}}$$

Where: $A_{time}$ is time required for spent analysis
$R_{time}$ is time required for refilling operation
$V_{tank5}$ is a desired volume of tank 5
$V_{user}$ is a defined maximum user tank volume.

Analytical equipment may be unavailable or partially available for immediate use, for example when refilling station 2 is a small capacity or mobile. Samples of received spent may be taken and stored at refilling station 2 until the analytical equipment becomes available or may be processed at a designated site equipped with analytical capabilities. In this case, spent collected from each user may reside in individual volumes, or may be mixed and analyzed as a single unload at a site where analytical equipment is available. Collected samples may be used to track individual spent contributors for future identification or other records including financial operations and transactions.

In general, refilling station 2 may be equipped with at least one and, if desired, more then one spent or fresh holding tanks similar to 3 and 4 to accommodate different product carriers. In addition, refilling station 2 may have multiple storages functionally equivalent to contamination storage 7 or intermediate tank 5, for example if the different carriers have the potential to be contaminants to each other. Instrumentation means 6 may contain different means to collect and/or store samples of spent if necessary. Such a procedure may ensure localization of contaminated spent.

If desired, a suitable single storage can be divided into two or more compartments as, for example, described in patents U.S. Pat. No. 6,802,875B1, U.S. Pat. No. 6,382,264B1, and WO03061047A1; hereby incorporated by reference. Thus, spent and fresh can be separated in a single storage, and/or normal condition spent can be separated from possibly contaminated spent. Also, a number of divided spent/fresh tanks may be used to accommodate different carriers The operations and systems of the instant invention may be manual, automated and combinations thereof. The operations and systems may include data collection and/or data use for, as example, identification, measurement, and other uses.

All loading and unloading operations can be performed simultaneously, sequentially, in parallel, or exclusive of each other. For example, one might want to replenish a vehicle fuel tank due to loss of carrier, therefore, only fresh will be loaded into the vehicle. This operation may involve special procedures and equipment such as, for example, dispensers with special flow organization; security devices such as, for example, special valves; ID controllers associated with car, refilling station, person performing refilling, or other required identification data; data collection systems; databanks; computer networks; etc. Information on these special procedures and equipment are disclosed in U.S. Pat. No. 6,616,036B2, US2003/0206102A1, U.S. Pat. Nos. 5,923,572, 6,374,870B1, U.S. Pat No. 5,579,233A, EP003588A2, and U.S. Pat. No. RE36510E, incorporated in their entireties herein by reference.

While the invention has been described with reference to certain embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A system for distributing a product releasably incorporated within a carrier, and for removing the product and returning spent for rehabilitation, the system including a first supply loop comprising:

a rehabilitation facility for releasably incorporating a product into a first carrier to form fresh;

delivery means for conveying fresh to a first user, the first user comprising a fresh storage vessel for receiving and storage of fresh, the first user further comprising means for removing product or product elements from the carrier to form spent;

a spent storage vessel for receiving, storing, and dispensing of spent from the first user; and means for delivering the spent to a rehabilitation facility of the spent to form fresh; wherein the first user comprises means for storing the removed product and means for incorporating the product or product elements into a second carrier within a second supply loop that comprises the rehabilitation facility.

2. The system of claim 1, wherein the product comprises hydrogen, wherein the carrier comprises at least one dehydrogenated organic chemical, wherein fresh comprises at least one hydrogenated derivative of the organic chemical, and wherein spent comprises at least one at least partially dehydrogenated derivative of the fresh.

3. The system of claim 1, wherein the user comprise at least one member selected from the group consisting of: filling stations, storage facilities, vehicles, power generators, industrial processes, distribution facilities, devices, and combinations thereof.

4. The system of claim 1, further comprising means for detecting at least one chemical or physical property of fresh, product, spent, carrier, or any combination thereof.

5. The system of claim 4, wherein the instrumentation means comprise at least one member selected from the group consisting of: viscometers, conductivity and density measuring devices, chemical analyzers, gas analyzers, chromatographs, ultraviolet/visible sensors (UV/Vis), light and infrared light (IR) sensors, microwave sensors, and combinations thereof.

6. The system of claim 1, wherein the first user comprises a filling station for a vehicle that utilizes the product as a fuel source.

7. A system for manufacturing and distributing a product releasably incorporated within a carrier, and for removing the product and returning the carrier for rehabilitation, the system including a first supply loop comprising:
   a manufacturing facility for releasably incorporating a product into a first carrier to form fresh or producing a carrier having product incorporated therein;
   delivery means for conveying fresh to a first user, the first user comprising a fresh storage vessel for receiving and storage of fresh, the first user further comprising means for removing product or product elements from the carrier to form spent, the first user further including delivery means for conveying the product to a second supply loop;
   a spent storage vessel for receiving, storing, and dispensing of spent from the first user, spent being defined as fresh with at least some product removed therefrom; and
   means for delivering the spent to a rehabilitation facility of the spent to form fresh; wherein the first user further comprises means for incorporating the product or product elements into a second carrier within a second supply loop that comprises an on-site rehabilitation facility.

8. The system of claim 7, wherein the product comprises at least one member selected from the group consisting of hydrogen, fluorine, chlorine, oxygen, arsine, stibine, phosgene, methane, hydrogen fluoride, gases containing boron, phosphorus, aluminum, or silicon components, and combinations thereof.

9. The system of claim 7, further comprising a second user connected with the second supply loop so as to permit the second user to withdraw fresh, product, or combinations thereof from the second loop, and to deliver spent into the second loop.

10. The system of claim 9, wherein the first user comprises a filling station, and wherein the second user comprises a device that consumes product as a fuel source.

11. The system of claim 7, wherein the first user further includes:
   a fresh storage vessel for receiving, storing, and transferring fresh from the rehabilitation facility;
   a fresh transferring apparatus linked to the fresh storage vessel for transferring fresh to a user when the user is connected to the apparatus;
   a spent storage vessel for receiving, storing, and transferring spent; and
   a spent removal apparatus linked to the spent storage vessel for removing spent from a user when the user is connected to the removal apparatus.

12. The system of claim 7, further comprising means for detecting at least one chemical or physical property change between fresh and spent.

13. The system of claim 12, wherein the detecting means comprises at least one member selected from the group consisting of: viscometers, conductivity and density measuring devices, chemical analyzers, gas analyzers, chromatographs, ultraviolet/visible sensors (UV/Vis), light and infrared light (IR) sensors, microwave sensors, and combinations thereof.

14. A method of distributing a product releasably incorporated into a carrier, the method comprising the steps of:
   releasably incorporating a product into a carrier to form fresh;
   transferring fresh to a first user for removal of product to form spent, without contaminating the product or spent; and
   delivering uncontaminated spent to a rehabilitation facility having means for rehabilitating the spent to form fresh; and further comprising the step of the first user delivering the product to a second supply loop, the first carrier and second supply loop being separated from one another to form two separate supply loops that do not interchange fresh, carrier, or spent.

15. The method of claim 14, further comprising the step of detecting at least one chemical or physical property of fresh, product, spent, carrier, or any combination thereof.

16. The method of claim 15, wherein the step of detecting comprises detecting at least one chemical or physical property of fresh, spent, product, and combinations thereof comprises by using at least one detecting means comprising at least one selected from the group consisting of: viscometers, conductivity and density measuring devices, chemical analyzers, gas analyzers, chromatographs, ultraviolet/visible sensors (UV/Vis), light and infrared light (IR) sensors, microwave sensors, and combinations thereof.

17. The method of claim 15, wherein the step of detecting at least one chemical or physical difference between fresh and spent comprises detecting the presence of a contaminant.

* * * * *